US012565085B2

(12) United States Patent
Zeng et al.

(10) Patent No.: US 12,565,085 B2
(45) Date of Patent: Mar. 3, 2026

(54) VEHICLE DOOR STRUCTURE AND WINDOW SEALING SYSTEM FOR VEHICLE DOOR

(71) Applicant: Henniges China Sealing Systems Co, Ltd, Beijing (CN)

(72) Inventors: Weiming Zeng, Langfang (CN); Zhongyuan Wang, Beijing (CN); Tong Zhou, Taicang (CN)

(73) Assignee: Henniges China Sealing Systems Co, Ltd, Beijing (CN)

( * ) Notice: Subject to any disclaimer, the term of this patent is extended or adjusted under 35 U.S.C. 154(b) by 427 days.

(21) Appl. No.: 18/154,112

(22) Filed: Jan. 13, 2023

(65) Prior Publication Data

US 2023/0226890 A1      Jul. 20, 2023

(30) Foreign Application Priority Data

Jan. 14, 2022    (CN) .......................... 202220104244.4

(51) Int. Cl.
| | |
|---|---|
| *B60J 5/04* | (2006.01) |
| *B60J 1/16* | (2006.01) |
| *B60J 10/76* | (2016.01) |

(52) U.S. Cl.
CPC .............. *B60J 5/0402* (2013.01); *B60J 1/16* (2013.01); *B60J 10/76* (2016.02)

(58) Field of Classification Search
CPC ............. B60J 1/17; B60J 5/0402; B60J 1/004
See application file for complete search history.

(56) References Cited

U.S. PATENT DOCUMENTS

| | | | |
|---|---|---|---|
| 4,370,832 A | 2/1983 | Koike |
| 4,457,111 A | 7/1984 | Koike |
| | (Continued) | | |

FOREIGN PATENT DOCUMENTS

| | | |
|---|---|---|
| CN | 208359897 U | 1/2019 |
| CN | 208530232 U | 2/2019 |
| | (Continued) | |

OTHER PUBLICATIONS

International Search Report for Application No. PCT/US2023/022729 dated Oct. 13, 2023, 2 pages.
(Continued)

*Primary Examiner* — Muhammad Ijaz
*Assistant Examiner* — Susan M. Heschel
(74) *Attorney, Agent, or Firm* — Howard & Howard Attorneys PLLC

(57) ABSTRACT

A window sealing system for a vehicle door structure having a door body, on which a window frame is arranged, that defines sliding grooves and a glass body flush with the door body. One side of the glass body has a concave surface and an opposite side has a convex surface. At least one side of the glass body of the window sealing system is provided with a guide piece slidably installed in the sliding groove. An arc-shaped limiting member is arranged on the guide piece. A bump limiter is arranged on the side of the guide piece. Since the bump limiter is a solid structure and the inner side of the arc-shaped limiting member is hollowed out, the bump limiter can resist greater pressure than the arc-shaped limiting member during the glass lifting process, preventing dislocation between the door and the glass to ensure good sealing.

9 Claims, 4 Drawing Sheets

(56) References Cited

U.S. PATENT DOCUMENTS

| | | | |
|---|---|---|---|
| 4,932,161 | A | 6/1990 | Keys et al. |
| 5,092,078 | A | 3/1992 | Keys |
| 5,461,830 | A | 10/1995 | Dupuy |
| 6,103,168 | A | 8/2000 | Kelly |
| 6,141,910 | A | 11/2000 | Kobrehel et al. |
| 6,402,874 | B1 | 6/2002 | Kelly |
| 6,416,113 | B1 | 7/2002 | Page |
| 7,854,094 | B2 | 12/2010 | Zimmer et al. |
| 7,934,342 | B2 | 5/2011 | Lahnala |
| 8,246,101 | B2 | 8/2012 | Cicala |
| 8,454,077 | B2 | 6/2013 | Charnesky et al. |
| 8,572,898 | B2 | 11/2013 | Grudzinski et al. |
| 8,646,215 | B2 | 2/2014 | Grudzinski et al. |
| 8,650,802 | B2 | 2/2014 | Grudzinski et al. |
| 8,667,739 | B2 | 3/2014 | Brookman |
| 8,793,938 | B2 | 8/2014 | Grudzinski et al. |
| 9,022,446 | B2 | 5/2015 | Zimmer et al. |
| 9,038,319 | B2 | 5/2015 | Kuwabara |
| 9,085,219 | B2 | 7/2015 | Wade et al. |
| 9,114,765 | B1 | 8/2015 | James et al. |
| 9,597,949 | B2 | 3/2017 | Nojiri |
| 9,925,850 | B2 | 3/2018 | Yoshida et al. |
| 9,944,158 | B2 | 4/2018 | Beach |
| 10,167,659 | B2 | 1/2019 | Sagisaka et al. |
| 10,427,511 | B2 | 10/2019 | Blottiau |
| 10,442,281 | B2 | 10/2019 | Krause |
| 10,457,121 | B2 | 10/2019 | Tallent et al. |
| 10,787,851 | B2 | 9/2020 | Freymouth et al. |
| 10,843,538 | B2 | 11/2020 | Heppner et al. |
| 10,954,394 | B2 | 3/2021 | Taniguchi et al. |
| 11,052,731 | B2 * | 7/2021 | Lorentsson ................ B60J 1/17 |
| 11,059,360 | B2 | 7/2021 | Guellec et al. |
| 11,299,109 | B2 | 4/2022 | Myszkowski et al. |
| 2005/0229496 | A1 | 10/2005 | Tashima et al. |
| 2006/0150522 | A1 | 7/2006 | Boccuto |
| 2007/0262608 | A1 | 11/2007 | Saito |
| 2010/0313487 | A1 | 12/2010 | Ellis et al. |
| 2011/0193296 | A1 | 8/2011 | Bara |
| 2012/0025564 | A1 | 2/2012 | Ellis et al. |
| 2016/0001645 | A1 | 1/2016 | Ortmueller |
| 2018/0141421 | A1 | 5/2018 | Blottiau |
| 2018/0312045 | A1 * | 11/2018 | Charge ................... B60J 5/0408 |
| 2020/0031213 | A1 | 1/2020 | Charge et al. |
| 2020/0086727 | A1 | 3/2020 | Guellec et al. |
| 2020/0180405 | A1 | 6/2020 | Blottiau et al. |
| 2020/0190405 | A1 * | 6/2020 | Kim ................... C08G 73/1017 |
| 2020/0215881 | A1 | 7/2020 | Baratin et al. |
| 2020/0247220 | A1 | 8/2020 | Lorentsson et al. |
| 2020/0307361 | A1 | 10/2020 | Kracht |
| 2020/0362611 | A1 | 11/2020 | Ishiguro et al. |
| 2021/0170835 | A1 | 6/2021 | Fukui |
| 2021/0347239 | A1 | 11/2021 | Nolte |
| 2022/0001726 | A1 | 1/2022 | Brenniger |
| 2022/0355654 | A1 | 11/2022 | Baratin et al. |

FOREIGN PATENT DOCUMENTS

| | | | |
|---|---|---|---|
| CN | 208530243 | U | 2/2019 |
| CN | 208530252 | U | 2/2019 |
| CN | 109910579 | A | 6/2019 |
| CN | 110654205 | A | 1/2020 |
| CN | 111923699 | A | 11/2020 |
| CN | 112918232 | B | 9/2021 |
| CN | 113696700 | A | 11/2021 |
| DE | 14 13 073 | A1 | 10/1995 |
| DE | 4413073 | A1 | 10/1995 |
| DE | 102019125811 | A1 | 3/2021 |
| EP | 3 647 093 | A1 | 4/2022 |
| EP | 3647093 | B1 | 4/2022 |
| JP | 2015178290 | A | 10/2015 |
| JP | 6315446 | B2 | 4/2018 |
| WO | 2010001016 | A1 | 1/2010 |
| WO | WO 2010/00106 | A1 | 1/2010 |
| WO | 2011014684 | A1 | 2/2011 |
| WO | 2013167818 | A1 | 11/2013 |
| WO | 2017076511 | A1 | 5/2017 |
| WO | 2017076513 | A1 | 5/2017 |
| WO | 2018008166 | A1 | 1/2018 |
| WO | 2018109007 | A1 | 6/2018 |
| WO | 2018109061 | A1 | 6/2018 |
| WO | 2020021174 | A1 | 1/2020 |
| WO | 2020254201 | A1 | 12/2020 |
| WO | 2022019849 | A1 | 1/2022 |

OTHER PUBLICATIONS

English language abstract for WO 2013/167818 A1 extracted from espacenet.com database on Oct. 16, 2023, 2 pages.

International Search Report for Application No. PCT/US2022/029768 dated Aug. 17, 2022, 1 page.

English language abstract for CN 208359897 U extracted from espacenet.com database on Mar. 19, 2023, 1 page.

English language abstract for CN 208530232 U extracted from espacenet.com database on Mar. 19, 2023, 1 page.

English language abstract for CN 208530243 U extracted from espacenet.com database on Mar. 19, 2023, 1 page.

English language abstract for CN 208530252 U extracted from espacenet.com database on Mar. 19, 2023, 1 page.

English language abstract for CN 109910579 A extracted from espacenet.com database on Mar. 19, 2023, 1 page.

English language abstract for CN 110654205 A extracted from espacenet.com database on Mar. 19, 2023, 1 page.

English language abstract for CN 111923699 A extracted from espacenet.com database on Mar. 19, 2023, 1 page.

English language abstract for CN 112918232 B extracted from espacenet.com database on Mar. 19, 2023, 1 page.

English language abstract for CN 113696700 A extracted from espacenet.com database on Mar. 19, 2023, 1 page.

English language abstract for DE 44 13 073 A1 extracted from espacenet.com database on Mar. 19, 2023, 1 page.

Machine-assisted English language abstract for DE 10 2019 125 811 A1 extracted from espacenet.com database on Mar. 19, 2023, 2 pages.

Machine-assisted English language abstract for EP 3 647 093 A1 extracted from espacenet.com database on Mar. 19, 2023, 2 pages.

English language abstract for JP 2015-178290 A extracted from espacenet.com database on Mar. 19, 2023, 1 page.

English language abstract for JP 6315446 B2 extracted from espacenet.com database on Mar. 19, 2023, 1 page.

English language abstract for WO 2010/001016 A1 extracted from espacenet.com database on Mar. 19, 2023, 1 page.

English language abstract for WO 2018/008166 A1 extracted from espacenet.com database on Mar. 19, 2023, 2 pages.

English language abstract for WO 2020/021174 A1 extracted from espacenet.com database on Mar. 19, 2023, 1 page.

English language abstract for WO 2020/254201 A1 extracted from espacenet.com database on Mar. 19, 2023, 1 page.

* cited by examiner

VEHICLE DOOR STRUCTURE AND WINDOW SEALING SYSTEM FOR VEHICLE DOOR

CROSS-REFERENCE TO RELATED APPLICATION

The subject patent application claims priority to and all of the benefits of Chinese Patent Application No. 202220104244.4, filed on Jan. 14, 2022, now granted Utility Model Patent No. 216580061(U), the disclosure of which is incorporated by reference herein.

TECHNICAL FIELD

The invention relates to the technical field of automobile door frame structures, in particular to a vehicle door structure and window sealing system for a vehicle door.

BACKGROUND TECHNIQUE

The side wall of the vehicle door is usually provided with a window glass, which not only has an aesthetic effect, but also is inconvenient to observe the outside environment of the vehicle. At present, there are two structural forms on the outside of the car door in the automotive industry: one is that there is a step difference between the side window glass and other parts in the door, that is, a step structure, which is not beautiful in appearance and will increase the wind resistance coefficient of the whole vehicle; the other is that there is no step difference between the side window glass and other parts in the door, that is, a step-free structure.

The non-level difference vehicle door structure in the prior art includes a glass member, a guide assembly arranged on the glass member, and a window frame groove on the plate body. The guide assembly drives the glass member to move in the window frame groove, and meanwhile, the window frame. There are sealing parts in the groove to seal the glass parts. When the glass parts are moving up and down, the glass parts are flush with the surface of the plate body, so that there is no step difference between the glass assembly and other parts in the door, that is, there is no step difference structure.

However, in the non-step structure in the prior art, the guide assembly on the glass piece is set as a sliding block, and the sliding block is slidably installed in the window frame groove. During use, since the glass piece needs to be lifted and lowered, after several times of lifting, there will be gaps in the other four directions perpendicular to the sliding direction between the slider and the window frame slot, which will cause the glass assembly to tilt, so that there is a step difference between the glass and the door, and it will also cause the glass and the door. The sealing effect between the glass and the door panel will become poor, and it will also cause air leakage and water leakage in the gap between the glass and the door panel.

SUMMARY OF THE INVENTION

Therefore, the technical problem to be solved by the present invention is to overcome the defect that the vehicle door and sealing systems in the prior art will tilt between the glass and the door frame after long-term use, resulting in poor sealing performance between the door frame and the glass.

The invention includes a vehicle door structure comprising: a door body, on which a window frame is arranged, defining sliding grooves arranged on both sides of the window frame along a vertical direction; a glass body flush with the door body, one side of the glass body having a first surface, and the other side having a second surface, a guide piece provided on at least one surface of the glass body with the guide piece slidably installed in one of the sliding grooves; an arc-shaped limiting member arranged on the same side of the glass body as the guide piece with the arc-shaped limiting member in sliding contact within the sliding groove; and a bump limiter arranged on the same side of the glass body as the guide piece with the bump limiter sliding and abutting within the sliding groove.

The invention also includes a window sealing system for a vehicle door structure having a door body, on which a window frame is arranged, that defines a sliding groove, and a glass body flush with the door body, one side of the glass body having a first surface, and the other side having a second surface, said window sealing system comprising: a guide piece adapted for connection on at least one surface of the glass body; a sealing member having a fitting part adapted for installation in the sliding groove to define a corresponding channel, an arc-shaped limiting member arranged on the guide piece with the arc-shaped limiting member in sliding contact with the channel; and a bump limiter arranged on the guide piece with the bump limiter sliding and abutting with the channel.

In the daily use of the door structure, since the door body and the glass body are not flat structures, the door body and the glass body are partially curved surfaces with a smooth transition. When the glass body is raised and lowered, the convex surface of the glass body faces the side The pressure on the guide piece is greater than the pressure on the guide piece on the side facing the concave surface of the glass body. The zero-step door structure will cause the guide piece to deform after the glass body is lifted and lowered for many times, causing the glass body and the door body. A gap occurs in the dislocation, resulting in poor sealing and sound insulation at the glass body. By setting the limit component on the guide on the side of the concave surface as an arc limiter, and setting the limit component on the guide on the convex surface side as a bump limiter, because the bump limiter is a solid structure, and the inner side of the arc limiter is hollowed out. During the lifting process of the glass body, the bump limiter can resist greater pressure than the arc limiter, which can effectively avoid the guide due to the different forces on both sides of the guide. The deformation of the parts prevents the dislocation between the door body and the glass body, and ensures that the door body and the glass body can still maintain good sealing during long-term use.

The vehicle door structure provided by the present invention can further comprise auxiliary bumps arranged in pairs on the guide piece, and the auxiliary bumps arranged in pairs are arranged on both sides of the groove; auxiliary bumps are arranged on both sides of the groove; an arc-shaped piece, the end of which is fixedly connected with the groove wall of the groove. The connecting lines between the arc limiters are vertical. By arranging auxiliary bumps and auxiliary arc-shaped pieces, the guide pieces are formed in two directions, longitudinal and transverse, and the four sides are limited. At the same time, during the lifting and lowering of the glass body, the forces on both sides of the guide piece in the transverse direction will also be different, according to the actual force situation. The auxiliary bumps are arranged on the side of the guide with greater force, and the auxiliary arc is arranged on the side of the guide with less force, and at the same time to avoid the guide in the horizontal and vertical directions. Deformation occurs on the upper surface, which can effectively improve the sealing between the glass body and the door body after being lifted and lowered for many times.

BRIEF DESCRIPTION OF THE DRAWINGS

In order to more clearly illustrate the specific embodiments of the present invention or the technical solutions in the prior art, the following will briefly introduce the accompanying drawings that need to be used in the description of the specific embodiments or the prior art. Obviously, the following descriptions of the accompanying drawings are some embodiments of the present invention. For those of ordinary skill in the art, other drawings can also be obtained based on these drawings without creative efforts.

Figure 1:
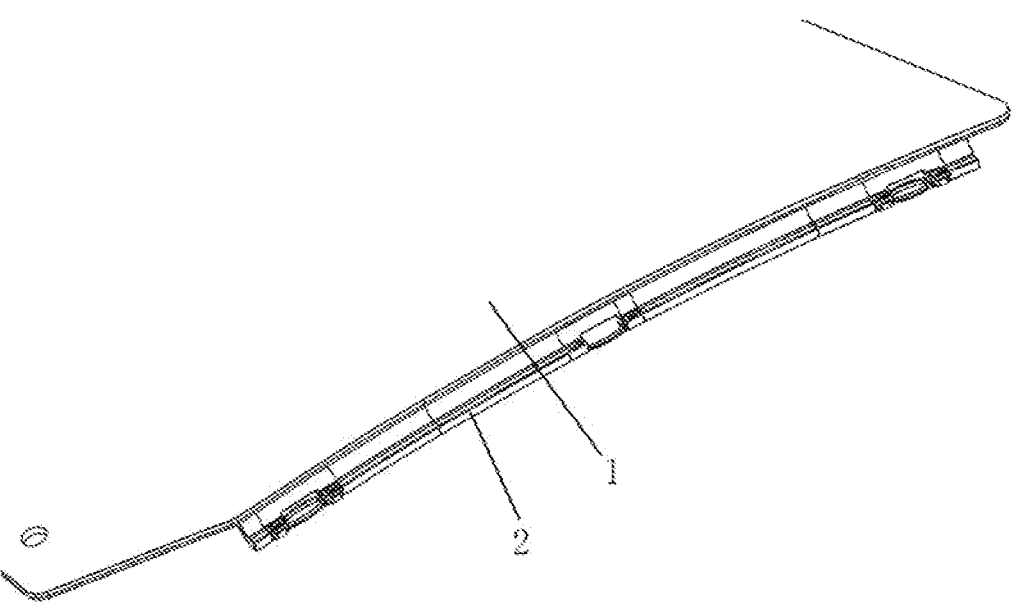
FIG. 1 is a schematic structural diagram of a guide piece on one side of a B-pillar provided in an embodiment of the present invention.

Description of reference numerals: 1. glass body; 2. guide piece; 3. sliding groove; 4. arc-shaped limiting member; 5. bump limiter; 6. auxiliary bump; 7. auxiliary arc-shaped member; 8. abutting portion; 9. fitting portion; 10. sealing lip; 11. hooking part; 12. inner plate body; 13. reinforcing plate; 14. fixing plate; 15. cover plate.

DETAILED DESCRIPTION

The technical solutions of the present invention will be clearly and completely described below with reference to the accompanying drawings. Obviously, the described embodiments are a part of the embodiments of the present invention, not all of the embodiments. Based on the embodiments of the present invention, all other embodiments obtained by those of ordinary skill in the art without creative work fall within the protection scope of the present invention.

In the description of the present invention, it should be noted that the terms "center", "upper", "lower", "left", "right", "vertical", "horizontal", "inner", "outer", and the like are based on the orientation or positional relationship shown in the accompanying drawings, which is only for the convenience of describing the present invention and simplifying the description, rather than indicating or implying that the referred device or element must have a specific orientation or be construed or operated in a specific orientation. Therefore, it should not be construed as a limitation on the present invention. Furthermore, the terms "first", "second", and "third" are used for descriptive purposes only and should not be construed to indicate or imply relative importance.

In the description of the present invention, it should be noted that, unless otherwise expressly specified and limited, the terms "installed", "connected" and "connected" should be understood in a broad sense, for example, it may be a fixed connection or a connectable connection. Detachable connection, or integral connection; may be mechanical connection or electrical connection; may be direct connection, or indirect connection through an intermediate medium, or internal communication between two components. For those of ordinary skill in the art, the specific meanings of the above terms in the present invention can be understood in specific situations.

In addition, the technical features involved in the different embodiments of the present invention described below can be combined with each other as long as there is no conflict with each other.

In FIG. 1 to FIG. 9, a zero-step vehicle door structure provided in this embodiment includes: a vehicle door body and a glass body 1 installed on the vehicle door body.

A window frame is arranged on the door body, and sliding grooves 3 are arranged on both sides of the window frame along the vertical direction. The glass body 1 is flush with the door body. One side of the glass body 1 is a concave surface, and the other side is a convex surface. The two edges of the glass body 1 that slide along the sliding groove 3 are provided with guide pieces 2, and the guide pieces 2 are arranged along the glass body 1. The edges of the glass body 1 are continuously arranged, and the guide piece 2 is slidably installed in the sliding groove 3. The guide piece 2 and the glass body 1 are connected by a connecting member, and the connecting member is inclined toward the concave surface of the glass body 1. The cross section of the guide piece 2 is rectangular, and the connecting member is connected to one edge of the guide piece 2.

The side of the guide piece 2 in the same direction as the concave surface of the glass body 1 is provided with an arc-shaped limiting member 4. The concave surface of the arc-shaped limiting member 4 faces the guide piece 2, and the convex surface of the arc-shaped limiting member 4 is in sliding contact within the sliding groove 3. The side of the guide piece 2 that is in the same direction as the raised surface is provided with a bump limiter 5, and the bump limiter 5 is in sliding contact within the sliding groove 3.

Figure 2:
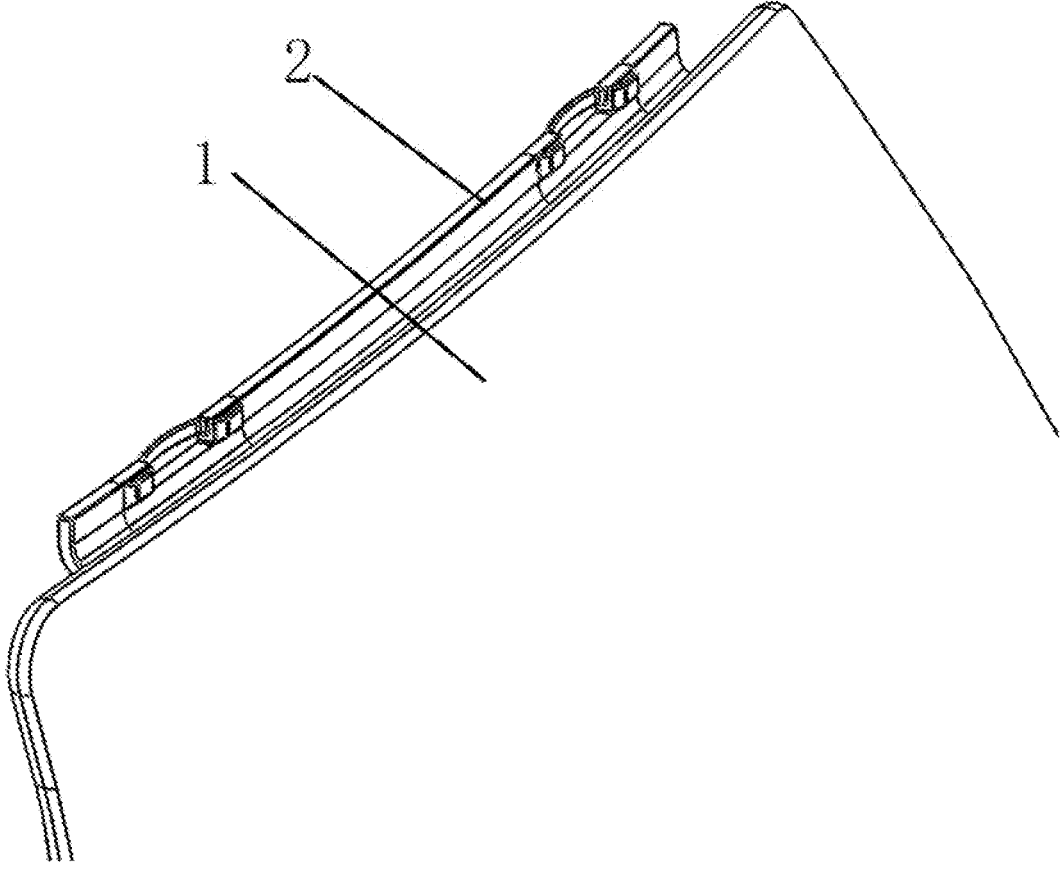
FIG. 2 is a schematic structural diagram of a guide piece on one side of an A-pillar provided in the embodiment of the present invention.
Figure 3:
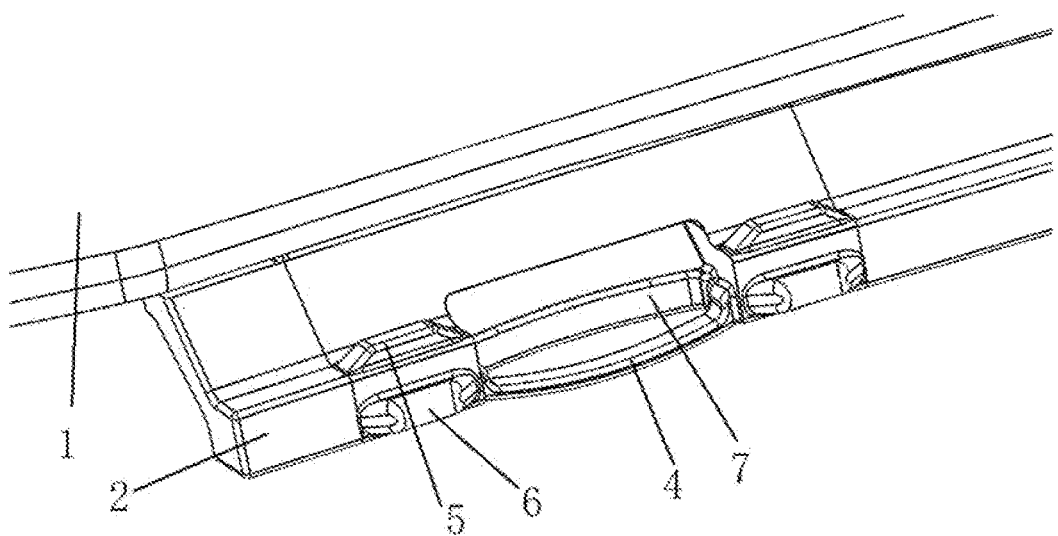
FIG. 3 is a schematic structural diagram of a guide piece on one side of the B-pillar provided in an embodiment of the present invention.
Figure 4:
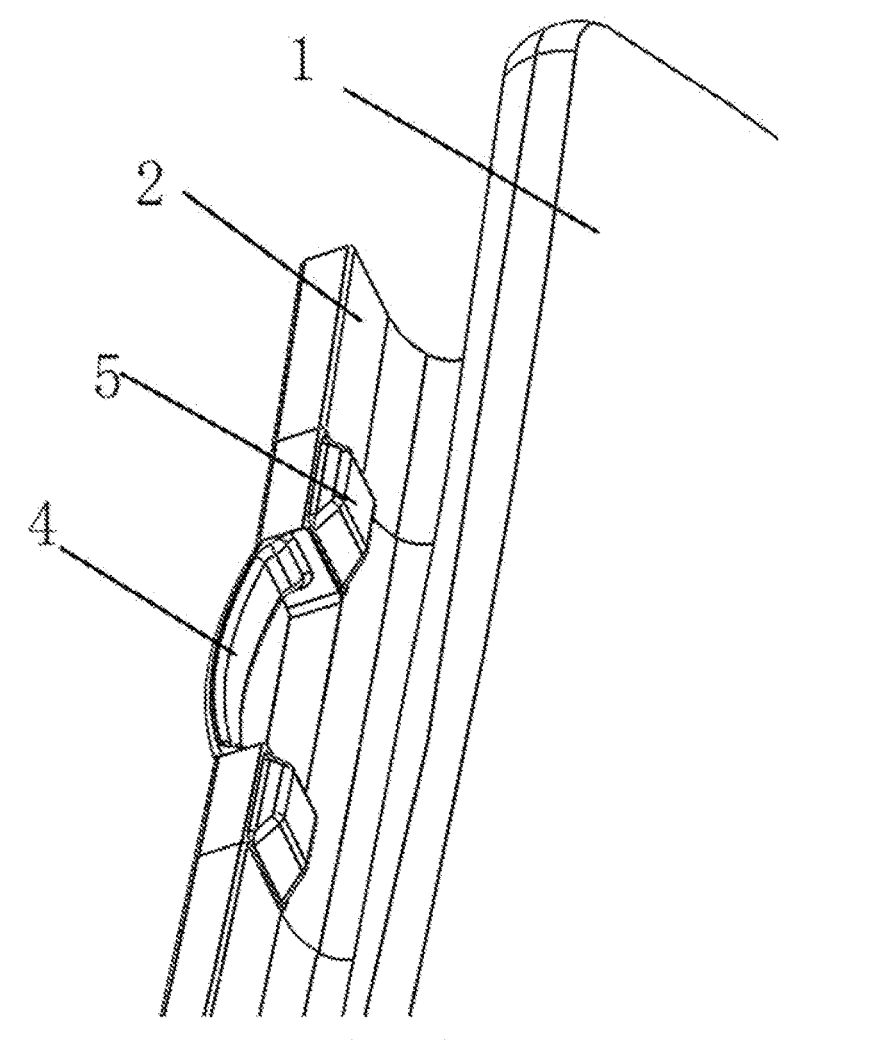
FIG. 4 is a schematic structural diagram of a guide piece_on one side of the A-pillar provided in the embodiment of the present invention.
Figure 5:
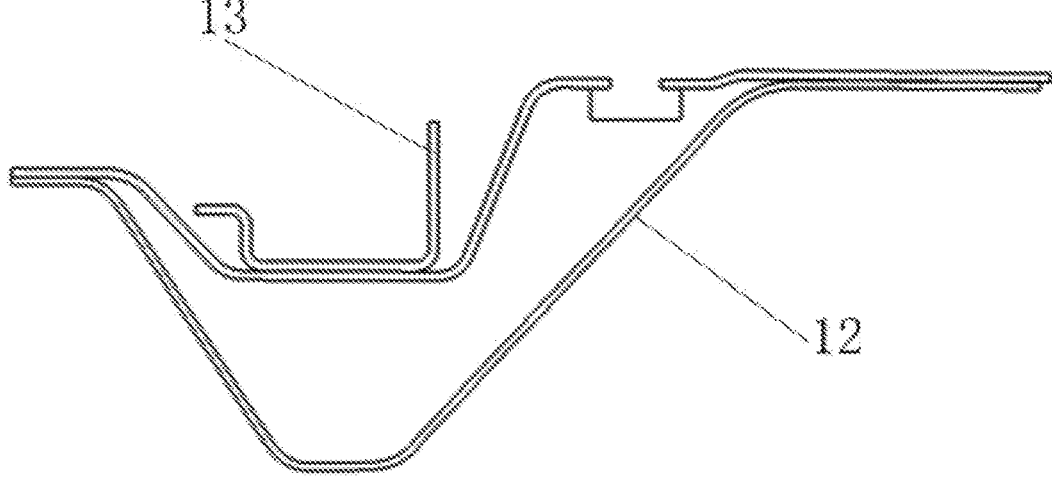
FIG. 5 is cross-sectional view of the inner plate body and the reinforcing plate provided in an embodiment of the present invention in cooperation with each other.
Figure 6:
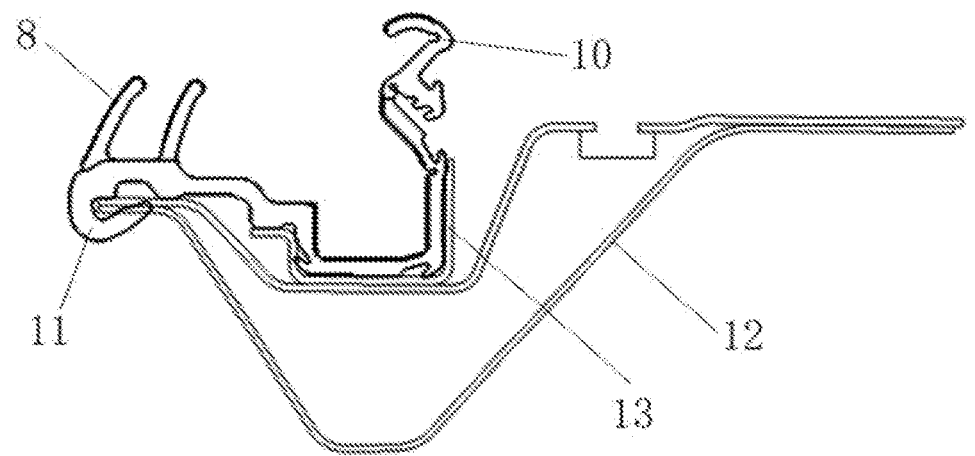
FIG. 6 is a cross-sectional view of the seal provided in the embodiment of the present invention installed in the sliding groove.
Figure 7:
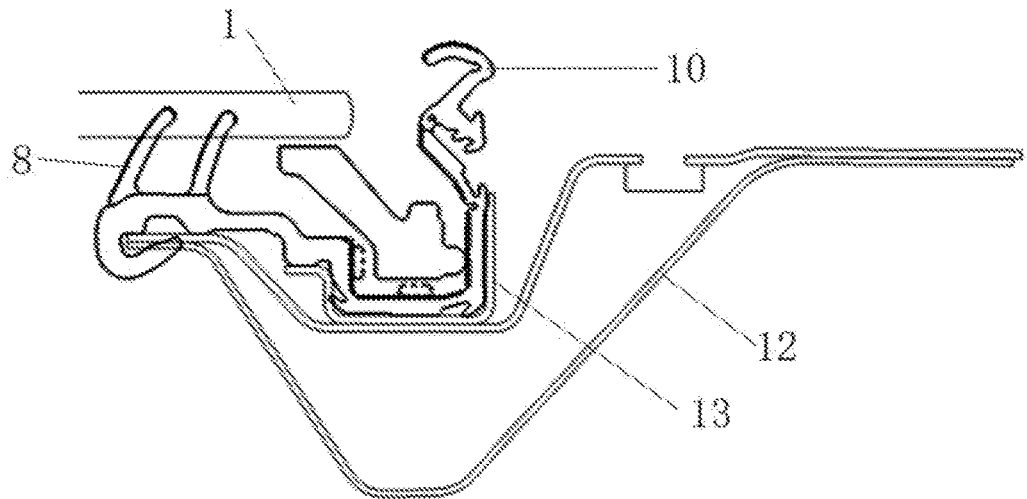
FIG. 7 is a cross-sectional view of a glass body and a sealing member provided in an embodiment of the present invention in cooperation with each other.
Figure 8:
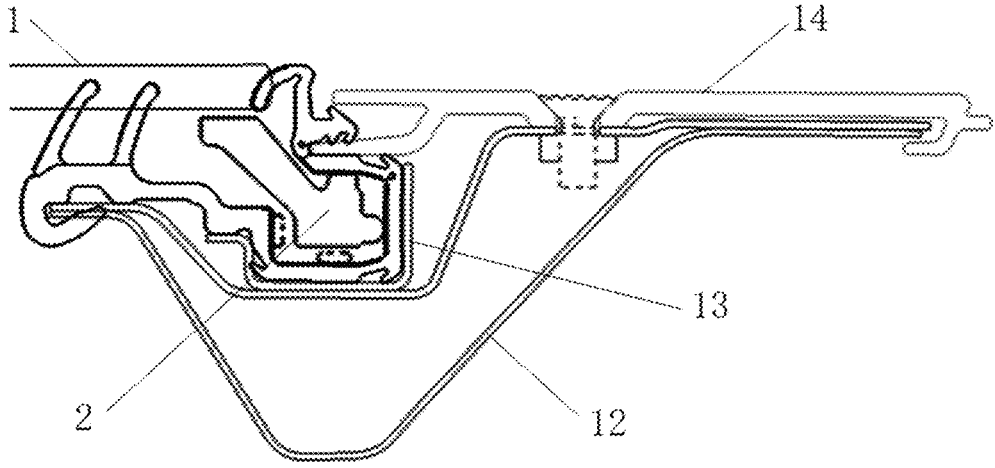
FIG. 8 is a cross-sectional view of the fixed plate, the sealing member and the reinforcement plate provided in an embodiment of the present invention in cooperation with each other.
Figure 9:
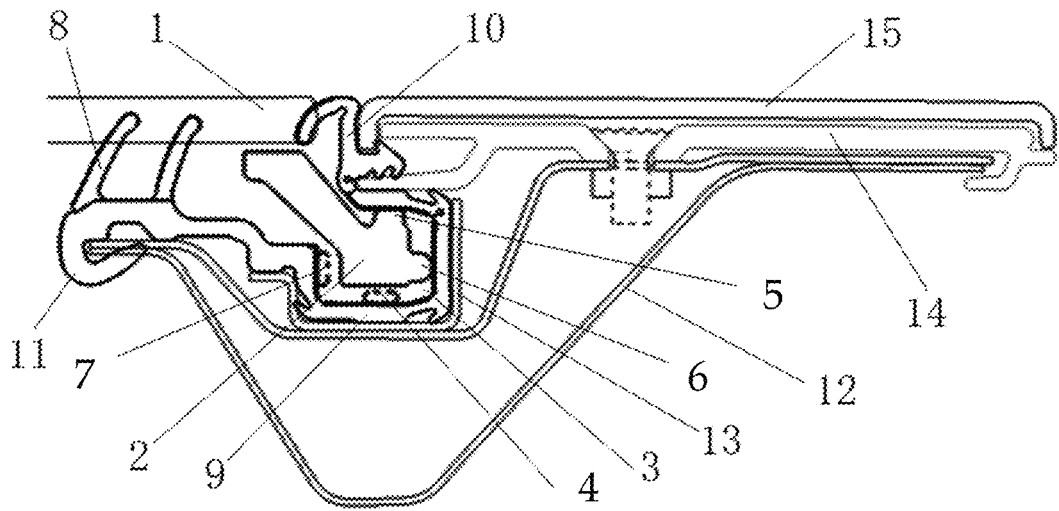
FIG. 9 is a cross-sectional view of a zero-step door structure provided in an embodiment of the present invention.

In order to facilitate the forming of the arc-shaped limiting member 4, a groove is formed on the side of the guide piece 2 away from the glass body 1, the end of the arc-shaped limiting member 4 is fixedly connected with the groove wall of the groove, and the convex-shaped bump limiter 5. They are arranged in pairs. The paired bump limiters 5 are arranged along the extending direction of the guide piece 2, and the grooves are provided between the pair of bump limiters 5. The guide piece 2 is also provided with an auxiliary bump 6 and an auxiliary arc-shaped member 7. The auxiliary bumps 6 are arranged on the guide piece 2 in pairs, and the auxiliary bumps 6 arranged in pairs are arranged on both sides of a groove; the end of the auxiliary arc-shaped member 7 is fixedly connected with the groove wall of the groove. In this embodiment, the auxiliary bump 6 is disposed on the side of the guide piece 2 away from the glass body 1, and the auxiliary arc-shaped member 7 is disposed on the side of the guide piece 2 facing the glass body 1. The connecting line between the paired auxiliary bumps 6 and the auxiliary arc-shaped members 7 is perpendicular to the connecting line between the paired bump limiters 5 and the arc-shaped limiting member 4. The guide piece 2 and the glass body 1 are connected by a connecting member, and the connecting member is inclined toward the concave surface of the glass body 1. The cross section of the guide piece 2 is rectangular, and the connecting member is connected to one edge of the guide piece 2. FIG. 1 is a schematic structural diagram of a guide piece installed on the B-pillar side of the glass body 1, and FIG. 2 is a structural schematic diagram of a guide piece installed on the A-pillar side of the glass body 1. The grooves on the two ends of the guide on one side of the B-pillar are provided with an arc-shaped limiting member 4, a bump limiter 5, an auxiliary bump 6 and an auxiliary arc-shaped member 7, which are in the middle of the guide on the B-pillar side. Only the arc-shaped limiting member 4 and the bump limiter 5 can be provided at the groove of the A-pillar and the groove on the guide on the side of the A-pillar.

A sealing member is installed in the sliding groove 3, the sealing member is continuously arranged along the extending direction of the sliding groove 3, and is laid on the inner wall of the sliding groove 3. The seal includes an abutting portion 8, a fitting portion 9, a scaling lip 10 and a hooking part 11. The abutting portion 8 is in contact with the side wall of the glass body 1. The fitting portion 9 is smoothly connected with the abutting portion 8, and the fitting portion 9 is fitted to the inner wall of the sliding groove 3 to define a corresponding channel of the sealing member. The arc-shaped limiting member 4 is in sliding contact with the channel of the sealing member, and the bump limiter 5 is in sliding contact with the channel of the sealing member. The sealing lip 10 is arranged on the side of the door body close to the glass body 1, and the sealing lip 10 is in contact with the glass body 1. The inner side of the door body is sequentially connected with an inner plate body 12 and a reinforcing plate 13, and the sliding groove 3 is enclosed by the reinforcing plate 13. The hooking part 11 is provided at the ends of the reinforcing plate 13 and the inner plate body 12 to wrap and seal the end portions of the reinforcing plate 13 and the inner plate body 12.

The door body includes a fixing plate 14 and a cover plate 15. The side of the fixing plate 14 facing the guide piece 2 is provided with a clamping end. The sealing lip 10 is clamped and installed in the clamping end, and the clamping end at least partially shields the sliding groove 3. The cover plate 15 is disposed outside the fixing plate 14, and the outer surface of the cover plate 15 is coplanar with the outer surface of the glass body 1.

As shown in FIGS. 5 to 9, when producing the vehicle door structure provided in this embodiment, the inner plate body 12, the reinforcing plate 13, the sealing lip 10, the glass body 1 with the guide piece 2, the fixing plate 14 and the cover plate 15 are prepared and formed according to the preset shapes. When assembling, the installer installs the reinforcing plate 13 in the corresponding groove body on the inner plate body 12, then lays the sealing lip 10 in the sliding groove 3 enclosed by the reinforcing plate 13, and then installs the guide on the glass body 1. Slide and install in the sliding groove 3 according to the preset direction, and finally cover the fixing plate 14 and the cover plate 15 on the inner plate body 12 in sequence to complete the assembly.

In the daily use process of the door structure, since the door body and the glass body 1 are not flat structures, the door body part and the glass body 1 are both smooth and have transitional arc surfaces. The pressure on the guide piece 2 on the side facing the glass body 1 is greater than the pressure on the guide piece 2 on the side facing the other surface of the glass body 1. The pressure on the side of the guide piece 2 away from the glass body 1 is greater than that on the side of the guide piece 2 facing the glass body 1. The pressure on the side of the door will cause the guide piece 2 to deform after the glass body 1 is lifted several times, causing dislocation and gaps between the glass body 1 and the door body, resulting in poor sealing and sound insulation of the glass body 1. The limit component on the guide piece 2 on the side of the concave surface and the limit component on the side of the guide piece 2 toward the glass body 1 is an arc-shaped limiting member 4. The guide piece 2 on the convex surface side and the guide piece 2 on the side facing away from the glass body 1 is set as a bump limiter 5. Since the bump limiter 5 is a solid structure, the inner side of the arc-shaped limiting member 4 is hollowed out, and is located on the glass body 1. During the lifting process, the bump limiter 5 can resist greater pressure than the arc-shaped limiting member 4, which can effectively avoid the deformation of the guide piece 2 caused by the different forces on both sides of the guide piece 2, and prevent deformation of the door body and the glass body 1. No dislocation occurs between the glass body 1 to ensure that the door body and the glass body 1 can still maintain good sealing during long-term use.

As an alternative embodiment, the guide piece 2 is not provided with a groove, and the guide piece 2 is formed between the convex bump limiter 5 and the arc-shaped limiting member 4.

The present invention also provides a vehicle door, which includes the zero-step difference vehicle door structure described in Embodiment 1. The reinforcing plate 13 is used to form a sliding groove 3, and the guide piece fixedly connected with the glass body 1 extends into the sliding groove 3. When the glass lifter drives the glass body 1 to move up and down, the glass body 1 can move in the sliding groove 3. It is ensured that the outer surface of the glass body 1 and the outer surface of the door body are coplanar; that is, there is no step difference between the glass body 1 and the door body. When viewing the window from the outside of the door, the outer surface of the glass body 1 and the outer surface of the door body are located at the same face. Through the arrangement of the sealing member, the gap between the door body and the glass body 1 can be effectively sealed, avoiding air leakage or water leakage at the connection or the gap, thereby ensuring the sealing effect of the zero-step door structure and improving the quietness in the car. The limit component on the guide piece on the side of the concave surface and the limit component on the side of the guide piece toward the glass body 1 is an arc limit component. The limit component on the guide piece on the convex surface side and the limit component on the side of the guide piece away from the glass body is set as a bump limiter 5. Since the bump limiter 5 is a solid structure, the inner side of the arc-shaped limiting member 4 is hollowed out, and the bump limiter 5 can be compared to the glass body 1 during the lifting process. The arc-shaped limiting member 4 resists greater pressure, which can effectively avoid the deformation of the guide piece 2 due to the different forces on both sides of the guide piece 2, prevent the dislocation between the door body and the glass body 1, and ensure good sealing between the door body and the glass body during long-term use.

Obviously, the above-mentioned embodiments are only examples for clear description, and are not intended to limit the implementation manner. For those of ordinary skill in the art, changes or modifications in other different forms can also be made on the basis of the above description. It is unnecessary and impossible to enumerate all embodiments here. The obvious changes or variations derived therefrom are still within the scope of protection of the present invention.

What is claimed is:

1. A vehicle door structure comprising:
a door body, on which a window frame is arranged, defining sliding grooves (3) arranged on both sides of the window frame along a vertical direction;
a glass body (1) flush with the door body, one side of the glass body (1) having a first surface, and the other side having a second surface,
a guide piece (2) having a first side and a second side with the second side opposite the first side, the guide piece (2) also having a third side and a fourth side opposite the third side, and the guide piece (2) provided on at least one surface of the glass body (1) with the guide piece (2) slidably installed in one of the sliding grooves (3), wherein a notch is formed in the guide piece (2) with the notch of the guide piece (2) having a pair of side walls;
an arc-shaped limiting member (4) fixedly connected to and between each of the pair of side walls of the notch of the guide piece (2) and arranged on the first side of the guide piece (2) with the arc-shaped limiting member (4) in sliding contact within the sliding groove (3);
a pair of bump limiters (5) arranged on the second side of the guide piece (2) opposite the arc-shaped limiting member (4) with the pair of bump limiters (5) sliding and abutting within the sliding groove (3) with the notch of the guide piece (2) provided between the pair of bump limiters (5);
a pair of auxiliary bumps (6) arranged on the third side of the guide piece (2) with the notch of the guide piece (2) provided between the pair of auxiliary bumps (6); and
an auxiliary arc-shaped member (7) fixedly connected to and between each of the pair of side walls of the notch of the guide piece (2) and arranged on the fourth side of the guide piece (2) opposite the pair of auxiliary bumps (6) with the auxiliary arc-shaped member (7) in sliding contact within the sliding groove (3),
wherein the arc-shaped limiting member (4) and the auxiliary arc-shaped member are each connected to and between the pair of side walls of the same notch formed in the guide piece (2).

2. The vehicle door structure according to claim 1, wherein the guide piece (2) and the glass body (1) are connected by a connecting member, and the connecting member is inclined toward the first surface of the glass body (1).

3. The vehicle door structure according to claim 1, wherein a sealing member is installed in the sliding groove (3), and the sealing member is arranged along the direction of the sliding groove (3).

4. The vehicle door structure according to claim 3, wherein the sealing member comprises:
an abutting portion (8), abutting with the side wall of the glass body (1);
a fitting portion (9) connected with the abutting portion (8), with the fitting portion (9) fitted on an inner wall of the sliding groove (3) to define a corresponding channel of the sealing member; and a sealing lip (10) arranged on the side of the door body close to the glass body (1), with the sealing lip (10) in contact with the glass body (1).

5. The vehicle door structure according to claim 4, wherein the arc-shaped limiting member (4) is in sliding contact with the channel of the fitting portion (9) of the sealing member within the sliding groove (3); and
wherein the pair of bump limiters (5) are sliding and abutting within the channel of the fitting portion (9) of the sealing member within the sliding groove (3) and abutting with the channel of the fitting portion (9) of the sealing member within the sliding groove (3).

6. The vehicle door structure according to claim 3, wherein the door body comprises:
a fixing plate (14) provided with a clamping end on the side facing the guide piece (2) with the sealing member clamped and installed in the clamping end, and the clamping end at least partially shields the sliding groove (3); and
a cover plate (15) provided on the outer side of the fixing plate (14), and the outer surface of the cover plate (15) is coplanar with the outer surface of the glass body (1).

7. A window sealing system for a vehicle door structure having a door body, on which a window frame is arranged, that defines a sliding groove (3), and a glass body (1) flush with the door body, one side of the glass body (1) having a first surface, and the other side having a second surface, said window sealing system comprising:
a guide piece (2) having a first side and a second side with the second side opposite the first side, the guide piece (2) also having a third side and a fourth side opposite the third side, and the guide piece (2) adapted for connection on at least one surface of the glass body (1), wherein a notch is formed in the guide piece (2) with the notch of the guide piece (2) having a pair of side walls;
a sealing member having a fitting portion (9) adapted for installation in the sliding groove (3) to define a corresponding channel,
an arc-shaped limiting member (4) fixedly connected to and between each the pair of side walls of the notch of the guide piece (2) and arranged on the first side of the guide piece (2) with the arc-shaped limiting member (4) in sliding contact with the channel of the fitting portion (9) of the sealing member within the sliding groove (3);
a pair of bump limiters (5) arranged on the second side of the guide piece (2) opposite the arc-shaped limiting member (4) with the pair of bump limiters (5) sliding within the channel of the fitting portion (9) of the sealing member within the sliding groove (3) and abutting with the channel of the fitting portion (9) of the sealing member within the sliding groove (3) with the notch of the guide piece (2) provided between the pair of bump limiters (5);
a pair of auxiliary bumps (6) arranged on the third side of the guide piece (2) with the notch of the guide piece (2) provided between the pair of auxiliary bumps (6); and
an auxiliary arc-shaped member (7) fixedly connected to and between each the pair of side walls of the notch of the guide piece (2) and arranged on the fourth side of the guide piece (2) opposite the pair of auxiliary bumps (6) with the auxiliary arc-shaped member (7) in sliding contact with the channel of the fitting portion (9) of the sealing member within the sliding groove (3),

wherein the arc-shaped limiting member (4) and the auxiliary arc-shaped member are each connected to and between the pair of side walls of the same notch formed in the guide piece (2).

8. The window sealing system according to claim 7, wherein the guide piece (2) and the glass body (1) are connected by a connecting member, and the connecting member is inclined toward the first surface of the glass body (1).

9. The window sealing system according to claim 7, wherein the sealing member further comprises:

an abutting portion (8) abutting with the side wall of the glass body (1); and a sealing lip (10) arranged on the side of the door body close to the glass body (1), with the sealing lip (10) in contact with the glass body (1), wherein the fitting portion (9) is connected with the abutting portion (8) with the fitting portion (9) fitted on an inner wall of the sliding groove (3) to define the corresponding channel of the sealing member.

\*   \*   \*   \*   \*